US012794639B2

(12) United States Patent
Shim et al.

(10) Patent No.: US 12,794,639 B2
(45) Date of Patent: Nov. 10, 2026

(54) METHOD AND APPARATUS FOR PERFORMING UPLINK TRANSMISSION AND RECEPTION IN WIRELESS COMMUNICATION SYSTEM

(71) Applicant: LG ELECTRONICS INC., Seoul (KR)

(72) Inventors: Jaenam Shim, Seoul (KR); Jaehyung Kim, Seoul (KR); Hyunsoo Ko, Seoul (KR); Suckchel Yang, Seoul (KR); Seonwook Kim, Seoul (KR); Seunggye Hwang, Seoul (KR); Seokmin Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 323 days.

(21) Appl. No.: 18/292,736

(22) PCT Filed: Aug. 3, 2022

(86) PCT No.: PCT/KR2022/011488
§ 371 (c)(1),
(2) Date: Jan. 26, 2024

(87) PCT Pub. No.: WO2023/014088
PCT Pub. Date: Feb. 9, 2023

(65) Prior Publication Data

US 2025/0088332 A1 Mar. 13, 2025

(30) Foreign Application Priority Data

Aug. 4, 2021 (KR) ........................ 10-2021-0102764

(51) Int. Cl.
*H04W 4/00* (2018.01)
*H04L 1/1829* (2023.01)
(Continued)

(52) U.S. Cl.
CPC .......... *H04L 5/0053* (2013.01); *H04L 1/1861* (2013.01); *H04W 72/232* (2023.01)

(58) Field of Classification Search
CPC ... H04L 5/0053; H04L 1/1861; H04L 1/1858; H04L 1/1896; H04L 5/0094; H04L 1/08; H04W 72/232; H04W 72/21
(Continued)

(56) References Cited

U.S. PATENT DOCUMENTS 11,071,097 B2 * 7/2021 Choi ..................... H04W 72/20
12,277,868 B2 * 4/2025 Mehta ...................... G09B 5/08
(Continued)

OTHER PUBLICATIONS

PCT International Application No. PCT/KR2022/011488, International Search Report dated Nov. 25, 2022, 3 pages.
(Continued)

*Primary Examiner* — Chuong T Ho
(74) *Attorney, Agent, or Firm* — LEE, HONG, DEGERMAN, KANG & WAIMEY

(57) ABSTRACT

Disclosed are a method and apparatus for performing PUCCH transmission in a wireless communication system. The method by which a terminal performs PUCCH transmission, according to an embodiment of the present disclosure, may comprise the steps of: receiving, from a base station, configuration information related to the number of first plurality of unit times at which the same PUCCH is to be transmitted; receiving DCI from the base station; and performing the PUCCH transmission at each of unit times corresponding to the number of second plurality of unit times that are based on information related to the DCI.

13 Claims, 8 Drawing Sheets

(51) Int. Cl.
*H04L 5/00* (2006.01)
*H04W 72/232* (2023.01)

(58) Field of Classification Search
USPC .......................................................... 370/329
See application file for complete search history.

(56) References Cited

U.S. PATENT DOCUMENTS

2021/0029708 A1 1/2021 Khoshnevisan et al.
2022/0191940 A1* 6/2022 MolavianJazi ...... H04B 17/328
2022/0321286 A1* 10/2022 Taherzadeh Boroujeni ................ H04L 1/1858
2022/0377812 A1* 11/2022 Jung ..................... H04L 1/0061
2023/0100345 A1* 3/2023 Ly ..................... H04W 72/0453 370/329
2023/0231662 A1* 7/2023 Gou ...................... H04L 1/1896 370/329
2023/0345465 A1* 10/2023 Fakoorian ......... H04W 72/1268
2024/0015707 A1* 1/2024 Ly ......................... H04L 5/0078
2025/0048344 A1* 2/2025 Liu ........................... H04L 1/18

OTHER PUBLICATIONS

CATT, "Discussion on PUCCH enhancements," R1-2104540, 3GPP TSG RAN WG1 #105-e, e-Meeting, May 2021, 6 pages.
Nokia et al., "PUCCH coverage enhancements," R1-2105904, 3GPP TSG RAN WG1 #105-e, e-Meeting, May 2021, 8 pages.
Sharp, "PUCCH coverage enhancement," R1-2105643, 3GPP TSG RAN WG1 #105-e, e-Meeting, May 2021, 10 pages.
Xiaomi, "PUCCH coverage enhancement," R1-2105578, 3GPP TSG RAN WG1 #105-e, e-Meeting, May 2021, 6 pages.

* cited by examiner

METHOD AND APPARATUS FOR PERFORMING UPLINK TRANSMISSION AND RECEPTION IN WIRELESS COMMUNICATION SYSTEM

CROSS-REFERENCE TO RELATED APPLICATIONS

This application is the National Stage filing under 35 U.S.C. 371 of International Application No. PCT/KR2022/011488, filed on Aug. 3, 2022, which claims the benefit of earlier filing date and right of priority to Korean Application No. 10-2021-0102764, filed on Aug. 4, 2021, the contents of which are all hereby incorporated by reference herein in their entireties.

TECHNICAL FIELD

The present disclosure relates to a wireless communication system, and more specifically, to a method and apparatus for transmitting and receiving a physical uplink control channel (PUCCH) in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

The technical problem of the present disclosure is to provide a method and device for performing PUCCH transmission and reception in a wireless communication system.

The technical problem of the present disclosure is to provide a method and device for dynamically indicating the number of repetitive transmissions of PUCCH in a wireless communication system.

The technical problem of the present disclosure is to provide a method and device for dynamically indicating the number of PUCCH repeated transmissions based on whether PUCCH resource information is configured in a wireless communication system.

The technical objects to be achieved by the present disclosure are not limited to the above-described technical objects, and other technical objects which are not described herein will be clearly understood by those skilled in the pertinent art from the following description.

In one embodiment of the present disclosure, a method for a user equipment (UE) to transmit a physical uplink control channel (PUCCH) in a wireless communication system may include receiving, from the base station, configuration information related to a number of first plurality of unit times in which a same PUCCH is transmitted: receiving, from the base station, downlink control information (DCI); and performing the PUCCH transmission in each of a second plurality of unit times based on information related to the DCI.

In another embodiment of the present disclosure, a method for a base station to perform a physical uplink control channel (PUCCH) reception in a wireless communication system may include transmitting, to a user equipment (UE), configuration information related to a number of first plurality of unit times in which a same PUCCH is transmitted; transmitting, to the UE, a downlink control information (DCI); and performing the PUCCH reception in each of a second plurality of unit times based on information related to the DCI.

According to an embodiment of the present disclosure, a method and device for performing PUCCH transmission and reception in a wireless communication system may be provided.

According to an embodiment of the present disclosure, a method and device for dynamically indicating the number of repeated transmissions of PUCCH in a wireless communication system may be provided.

According to an embodiment of the present disclosure, a method and apparatus for dynamically indicating the number of repeated PUCCH transmissions based on whether PUCCH resource information is configured in a wireless communication system may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
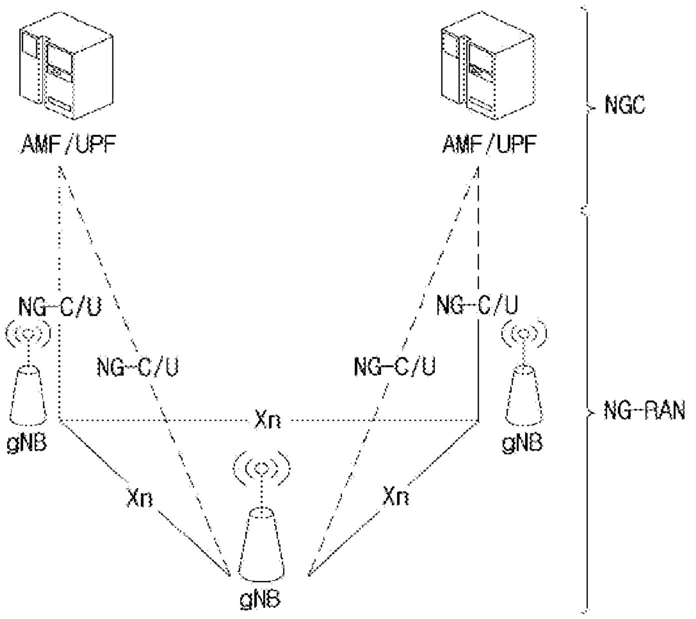
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB(evolved-NodeB), a gNB(Next Generation NodeB), a BTS(base transceiver system), an Access Point(AP), a Network(5G network), an AI(Artificial Intelligence) system/module, an RSU(road side unit), a robot, a drone(UAV: Unmanned Aerial Vehicle), an AR(Augmented Reality) device, a VR(Virtual Reality) device, etc. In addition, a terminal may be fixed or mobile, and may be substituted with a term such as a UE(User Equipment), an MS(Mobile Station), a UT(user terminal), an MSS(Mobile Subscriber Station), an SS(Subscriber Station), an AMS(Advanced Mobile Station), a WT(Wireless terminal), an MTC(Machine-Type Communication) device, an M2M(Machine-to-Machine) device, a D2D(Device-to-Device) device, a vehicle, an RSU(road side unit), a robot, an AI(Artificial Intelligence) module, a drone(UAV: Unmanned Aerial Vehicle), an AR(Augmented Reality) device, a VR(Virtual Reality) device, etc.

The following description may be used for a variety of radio access systems such as CDMA, FDMA. TDMA, OFDMA, SC-FDMA, etc. CDMA may be implemented by a wireless technology such as UTRA(Universal Terrestrial Radio Access) or CDMA2000. TDMA may be implemented by a radio technology such as GSM (Global System for Mobile communications)/GPRS(General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA(Evolved UTRA), etc. UTRA is a part of a UMTS (Universal Mobile Telecommunications System). 3GPP(3rd Generation Partnership Project) LTE(Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS(Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS(access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF(Access and Mobility Management Function) through an N2 interface, and is connected to a UPF(User Plane Function) through an N3 interface.

Figure 2:
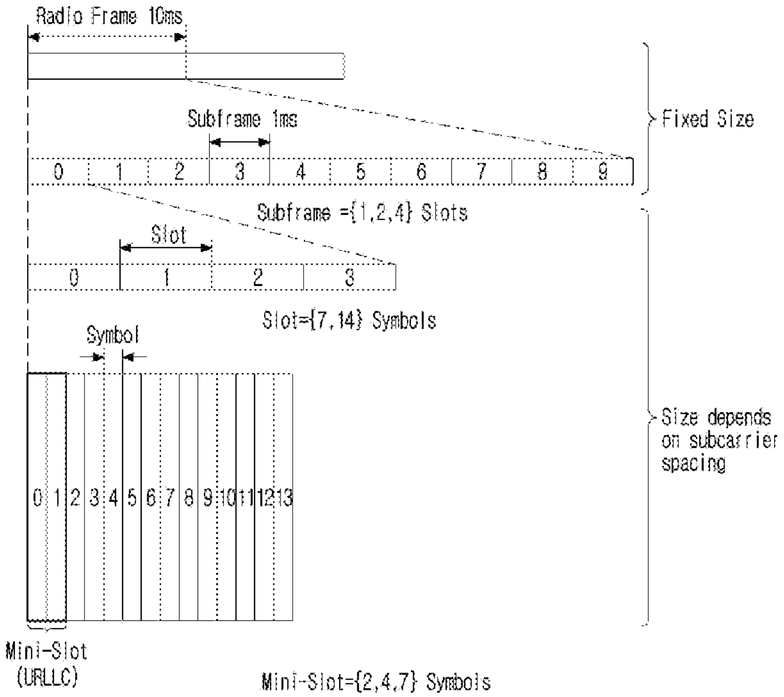
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, u). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max}\cdot N_f)$. Here, $\Delta f_{max}$ is $480\cdot 10^3$ Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with 10 subframes having a duration of $T_{sf}=(\Delta f_{max}N_f/1000)$. $T_c=1$ ms, respectively.

In this case, there may be one set of frames for an uplink and one set of frames for a downlink. In addition, transmission in an uplink frame No. i from a terminal should start earlier by $T_{TA}=(N_{TA}+N_{TA}$, offset) $T_c$ than a corresponding downlink frame in a corresponding terminal starts. For a subcarrier spacing configuration μ, slots are numbered in an increasing order of $n_s^{\mu}\in\{0, \ldots, N_{slot}^{subframe,\mu}-1\}$ in a subframe and are numbered in an increasing order of $n_s^{\mu}\in\{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu}N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered.

Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
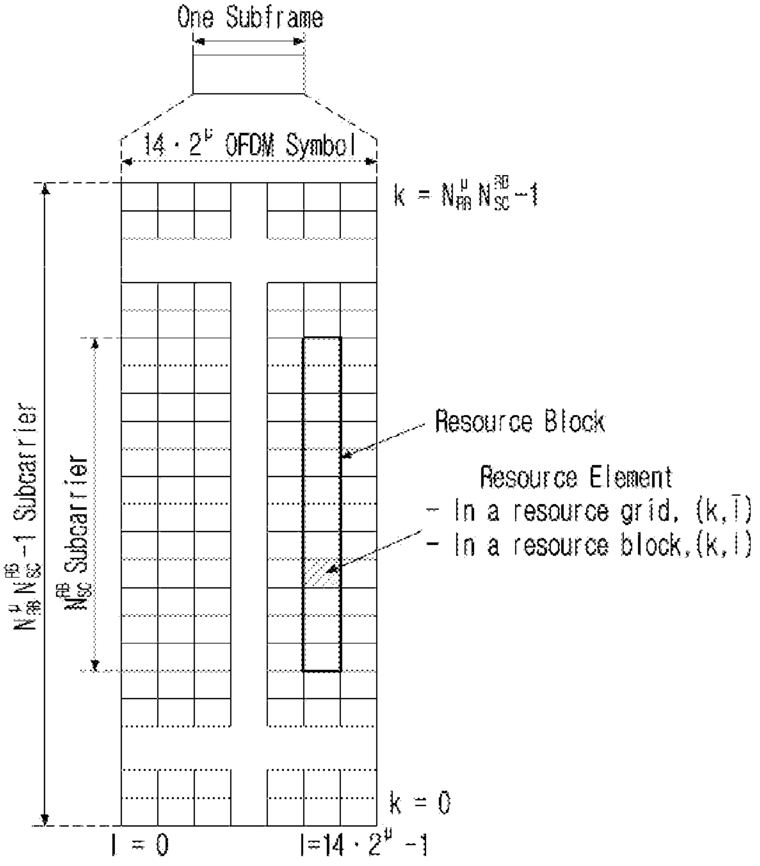
FIG. 3 illustrates a resource grid in a wireless communication system to which the present disclosure may be applied.

FIG. 3 illustrates a resource grid in a wireless communication system to which the present disclosure may be applied. In reference to FIG. 3, it is illustratively described that a resource grid is configured with $N_{RB}^{\mu}N_{sc}^{RB}$ subcarriers in a frequency domain and one subframe is configured with $14\cdot 2^{\mu}$ OFDM symbols, but it is not limited thereto. In an NR system, a transmitted signal is described by OFDM symbols of $2^{\mu}Nsymb^{(\mu)}$ and one or more resource grids configured with $N_{RB}^{\mu}N_{sc}^{RB}$ subcarriers. Here, $N_{RB}^{\mu}\leq N_{RB}^{max,\mu}$. The $N_{RB}^{max,\mu}$ represents a maximum transmission bandwidth, which may be different between an uplink and a downlink as well as between numerologies.

In this case, one resource grid may be configured per μ and antenna port p. Each element of a resource grid for u and an antenna port p is referred to as a resource element and is uniquely identified by an index pair (k,l'). Here, k=0, . . . , $N_{RB}^{\mu}N_{sc}^{RB}-1$ is an index in a frequency domain and l'=0 . . . ,$2^{\mu}N_{symb}^{(\mu)}-1$ refers to a position of a symbol in a subframe. When referring to a resource element in a slot, an index pair (k,l) is used. Here, 1=0 . . . , $N_{symb}^{\mu}-1$. A resource element (k,l') for μ and an antenna port p corresponds to a complex value, $a_{k,l'}^{(p,\mu)}$. When there is no risk of confusion or when a specific antenna port or numerology is not specified, indexes p and u may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequency PointA represents a frequency-position of point A expressed as in ARFCN (absolute radio-frequency channel number). Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu}=\left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following $$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
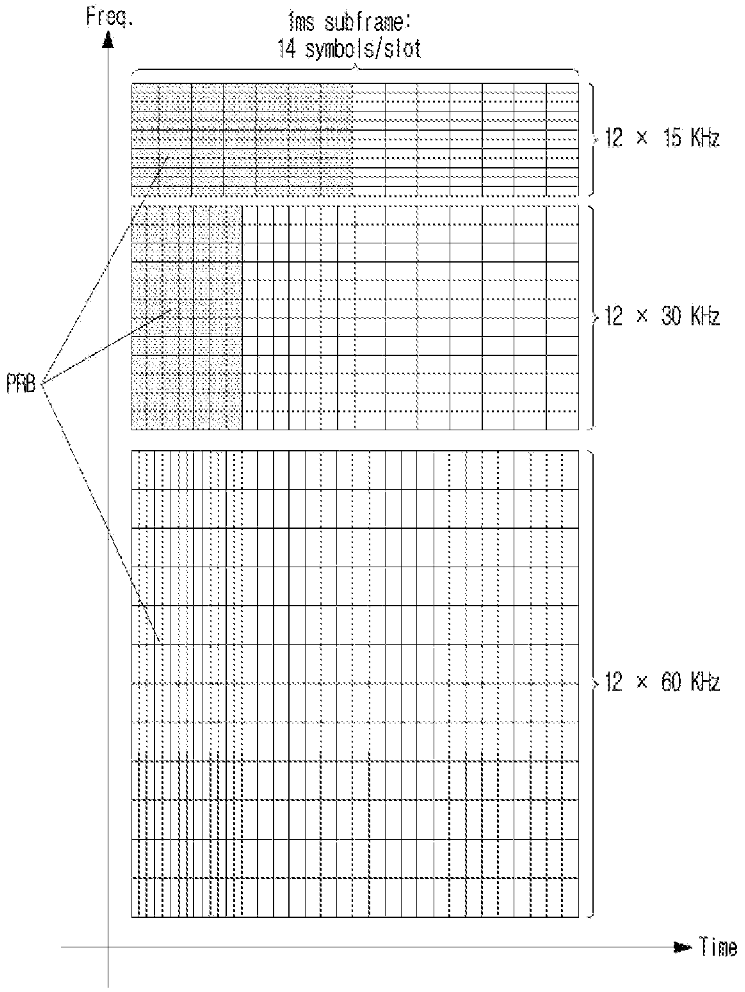
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
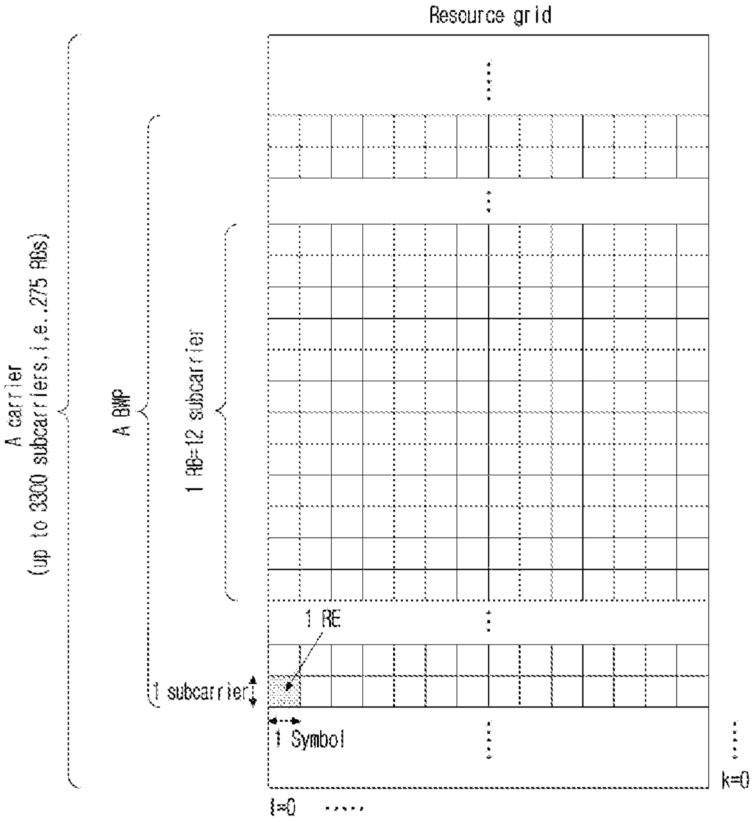
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP.

Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC.

A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP.

But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
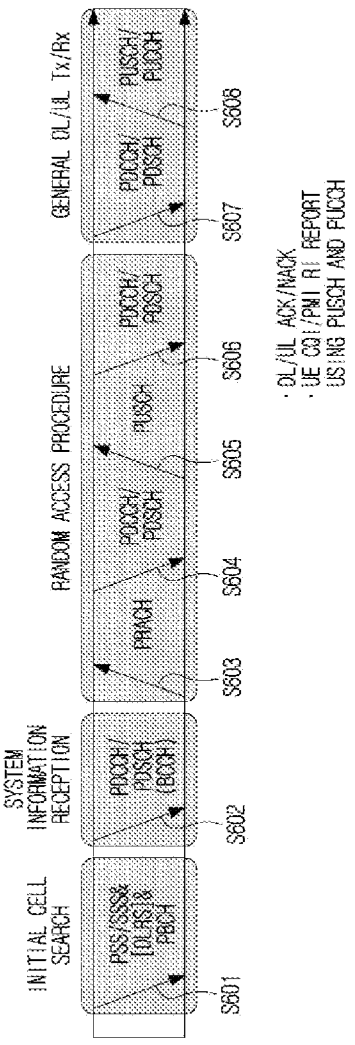
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement)

signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI(Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)—PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

PUCCH Configuration and Repetition Transmission Method

PUCCH may carry uplink control information (UCI). UCI may include at least one of HARQ (hybrid automatic request)—ACK information, SR (scheduling request), or CSI information. The UCI type (or usage, payload type), transmission duration, etc. that can be transmitted for each PUCCH format may vary. For example, as shown in Table 6 below, PUCCH may be divided into five formats.

TABLE 6

| Format | OFDM symbol based PUCCH duration | Number of bits | Usage | Waveform | Modulation |
|---|---|---|---|---|---|
| 0 | 1-2 | ≤2 | HARQ-ACK, SR | CP-OFDM | — |
| 1 | 4-14 | ≤2 | HARQ-ACK, SR | CP-OFDM | BPSK or QPSK |
| 2 | 1-2 | >2 | HARQ-ACK, SR, CSI | CP-OFDM | QPSK |
| 3 | 4-14 | >2 | HARQ-ACK, SR, CSI | DFT-s-OFDM | π/2 BPSK or QPSK |
| 4 | 4-14 | >2 | HARQ-ACK, SR, CSI | DFT-s-OFDM | π/2 BPSK or QPSK |

PUCCH of formats 0 and 2 may be expressed as a short duration PUCCH, and PUCCH of formats 1, 3, and 4 may be expressed as a long duration PUCCH. PUCCHs in formats 0, 1, and 4 may be multiplexed in the frequency/time domain, but PUCCHs in formats 2 and 3 may not be multiplexed in the frequency/time domain. To improve PUCCH's coverage, methods such as configuration of sequence-based DMRS-less PUCCH, higher DMRS density, dynamic PUCCH repetition factor indication, or DMRS bundling for PUCCH, improved frequency hopping, improved power control, and increased number of allowed repetitions may be used.

Additionally, repeated PUCCH transmission may be performed to improve PUCCH coverage. Here, only PUCCH (i.e., long interval PUCCH) with formats 1, 3, and 4 can be transmitted repeatedly. The number of repeated transmissions of PUCCH may be configured by higher layer signaling (e.g., 'nrofSlots' included in 'PUCCH-FormatConfig') and can be set to 2, 4, or 8.

The repeatedly transmitted PUCCH may have the same location within each slot. That is, the number of first symbols and consecutive symbols of PUCCH repeatedly transmitted in each slot may be the same. And, when frequency hopping is configured by higher layer signaling (e.g., 'interslotFrequencyHopping' included in 'PUCCH-FormatConfig') for repeatedly transmitted PUCCH, the position of the PUCCH during even slots may be defined by the 'startPRB' information element, and the position of the PUCCH during odd slots may be defined by the 'secondHopPRB' information element.

The higher layer signaling ('PUCCH-FormatConfig'), which includes information related to the number of repetitive transmissions and frequency hopping of PUCCH, may be configured as shown in Table 7 below.

TABLE 7

```
PUCCH-FormatConfig ::=          SEQUENCE {
    interslotFrequency Hopping      ENUMERATED {enabled}
OPTIONAL, -- Need R
    additionalDMRS                  ENUMERATED {true}
OPTIONAL, -- Need R
    maxCodeRate                     PUCCH-MaxCodeRate
OPTIONAL, -- Need R
    nrofSlots                       ENUMERATED {n2,n4,n8}
OPTIONAL, -- Need S
    pi2BPSK                         ENUMERATED {enabled}
OPTIONAL, -- Need R
    simultaneousHARQ-ACK-CSI        ENUMERATED {true}
OPTIONAL -- Need R
}
```

And, the UE may not multiplex different UCI types of repeated PUCCH. Therefore, when different PUCCHs overlap in a section within a slot, the UE may transmit only one PUCCH according to a priority rule and drop the remaining PUCCH or transmit the earliest staring PUCCH with the same priority. As an example of a priority rule, the priority may be high in the order of HARQ-ACK, SR, and CSI. That is, only PUCCH with a long interval format may be repeatedly transmitted only within the same location in each slot, and the actual number of repetitions may be smaller than the number set by higher layer signaling. Additionally, it may be difficult to perform repeated PUCCH transmission in a specific slot (e.g., special slot, etc.) that includes all downlink, uplink, and flexible symbols. In this case, the above-described method may be used to improve PUCCH coverage.

In addition, repeated PUCCH transmission may be performed in the specific slot through UCI split (e.g., dividing the UCI payload into a short section PUCCH and a long section PUCCH). However, the above-described method has a limitation that the benefit in terms of latency reduction is higher than in terms of coverage improvement.

To improve coverage, as an example of a PUCCH repetitive transmission method, like the existing PUSCH repetition type B, the PUCCH may be repeatedly transmitted in consecutive symbols rather than setting repetition by specifying the start symbol and length within the slot.

PUCCH Repetitive Transmission and Resource Indication Method

As described above, the number of repeated transmissions of PUCCH may be configured to 2, 4, or 8 by higher layer signaling ('nrofSlots' included in 'PUCCH-FormatConfig').

The PUCCH resource indication method may be divided into two methods depending on the presence or absence of a dedicated PUCCH resource configuration (e.g., 'PUCCH-ResourceSet').

When dedicated PUCCH resources are not configured (without dedicated PUCCH resource configuration), as shown in Table 8, a total of 16 PUCCH resource sets may be configured through 'pucch-ResourceCommon'.

TABLE 8

| PUCCH resource set index | PUCCH format | First symbol | Number of symbols | PRB offset | Set of initial CS indices |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0,6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0,6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

The base station may indicate a control channel element (CCE) index and a 3-bit PUCCH resource indicator (PRI). As the corresponding CCE index and PRI are applied to the following rules (e.g., Equation 3), a specific PUCCH resource set among 16 PUCCH resource sets may be indicated to the UE. The above method may be applied to PUCCH format 0,1.

$$r_{PUCCH} = \left\lfloor \frac{2 * n_{CCE,0}}{N_{CCE}} \right\rfloor + 2 * \Delta_{PRI} \quad \text{Equation 3}$$

When dedicated PUCCH resources are configured, up to four PUCCH resources (e.g., PUCCH resource sets 0, 1, 2, and 3) may be configured for the UE. A PUCCH resource set may be selected based on the number of bits of the UCI and the content of the UCI (e.g., HARQ, SR, CSI).

PUCCH resource set 0 may include HARQ and SR, and the number of bits of the corresponding UCI may be 2 or less. PUCCH resource set 0 may be applied to PUCCH formats 0 and 1, and the maximum number of PUCCH resources can be 32. As the CCE index and PRI are applied to the rules according to Equation 4 below, PUCCH resources may be indicated to the terminal.

$$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lceil \frac{R_{PUCCH}}{8} \right\rceil + R_{PUCCH} \bmod 8 & \text{if } \Delta_{PRI} \geq R_{PUCCH} \bmod 8 \end{cases} \quad \text{[Equation 4]}$$

PUCCH resource sets 1, 2, and 3 may include HARQ and CSI. The number of bits of UCI corresponding to PUCCH resource set 1 is greater than 2 and less than or equal to N2 (e.g., if not set, 1706), the number of UCI bits corresponding to PUCCH resource set 2 is greater than N2 and less than or equal to N3 (e.g., if not set, 1706), and the number of bits of UCI corresponding to PUCCH resource set 3 may be greater than N3 and less than or equal to 1706. PUCCH resource sets 1, 2, and 3 can be applied to PUCCH formats 2, 3, and 4, and the maximum number of PUCCH resources may be 8. PUCCH resources can be indicated through 3 bits of PRI within PUCCH resource sets 1, 2, and 3.

Hereinafter, a method for dynamically indicating the number of repetitions of PUCCH will be described. In describing the present disclosure, the number of repetitions of PUCCH may mean the number of repetitions of PUCCH transmission.

If the number of PUCCH repetitions may be configured only by higher layer signaling (e.g., RRC signaling), repetition for the initial PUCCH is not performed, making it difficult to overcome coverage shortage.

Additionally, there is a problem that the update speed of the PUCCH repetition number is slow. Accordingly, the number of PUCCH repetitions once configured may be applied longer than necessary, and it may take a long time to update to a repetition number sufficient to overcome the channel. Therefore, a method for dynamically indicating the number of repetitions of PUCCH may be needed.

Figure 7:
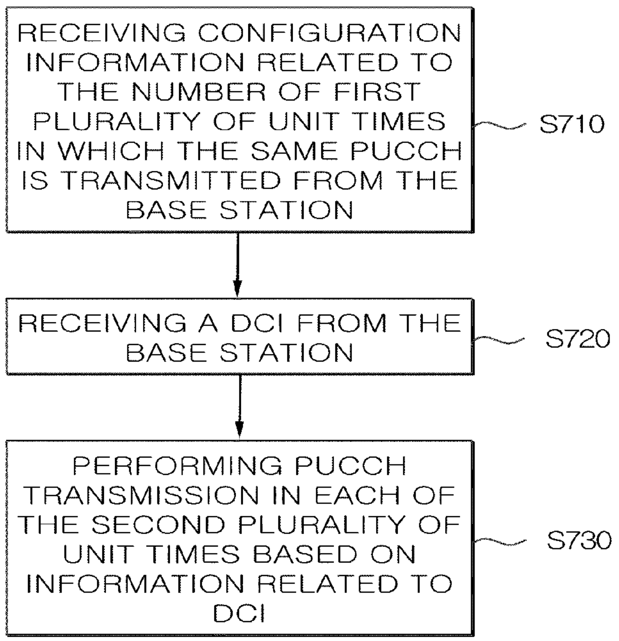
FIG. 7 is a diagram for describing an uplink transmission operation or a downlink reception operation of a terminal in a wireless communication system to which the present disclosure may be applied.

FIG. 7 is a diagram for explaining a PUCCH transmission method of a UE in a wireless communication system to which the present disclosure may be applied.

In describing the present disclosure, unit time may mean a unit in which PUCCH transmission is repeated. As an example, the unit time may include at least one of a slot, a slot group (i.e., a group containing one or more slots), a symbol, or a symbol group (i.e., a group containing one or more symbols).

For example, when the unit time is a slot, the same PUCCH may be repeatedly transmitted on a slot basis. Additionally, the same PUCCH starts from the same symbol within the slot, and the number of consecutive symbols through which the PUCCH is transmitted may be the same. In the following description, the case where the unit time is a slot is described, but the unit time is not limited thereto, and the unit time may be set/defined as a slot group, symbol, or symbol group.

The UE may receive, from the base station, configuration information related to the number of first plurality of unit times in which the same PUCCH is (or will be) transmitted (S710).

As an example, assume that the unit time is a slot. The number of first plurality of slots may mean the number of repeated transmissions of PUCCH. That is, transmitting the PUCCH based on configuration information may mean that the same PUCCH may be transmitted in the same symbol in each of the slots of the first plurality of slots. The fact that the same PUCCH is transmitted on the same symbol in each slot may mean that the start symbol of the PUCCH and the number of consecutive symbols transmitted are the same in each slot.

For example, the configuration information may include 'nrofSlots' included in 'PUCCH-FormatConfig', but is not limited to this and may include various information related to the number of PUCCH repeated transmissions.

The UE may receive downlink control information (DCI) from the base station (S720). DCI may include a PUCCH resource indicator (PRI) field, etc.

The UE may perform PUCCH transmission in each of the second plurality of unit times based on information related to DCI (S730).

The number of second plurality of unit times (e.g., slots) may mean the number of repeated transmissions of PUCCH. That is, the number of repeated transmissions of PUCCH may be indicated by the number of second plurality of slots based on information related to DCI. The UE may transmit the same PUCCH at the same symbol position in each of the second plurality of slots.

The number of second plurality of unit times (e.g., slots) may be less than or equal to the number of first plurality of unit times. However, this is only an example, and the number of second plurality of unit times may exceed the number of first plurality of unit times.

Here, information related to the DCI may include at least one of the PRI field included in the DCI or the aggregation level (control channel element (CCE)) corresponding to the physical downlink control channel (PDCCH) carrying the DCI.

Here, the PDCCH may occupy a certain number of REs according to the corresponding aggregation level. The aggregation level may mean the number of CCEs used when transmitting one DCI through PDCCH. Here, 1 CCE may mean 6 REG (Resource Element Groups) (i.e., 72 RE). The relationship between the aggregation level and the number of CCEs may be configured as shown in Table 9 below.

TABLE 9

| DCI aggregation level | CCE |
|---|---|
| 1 | 1 |
| 2 | 2 |
| 4 | 4 |
| 8 | 8 |
| 16 | 16 |

As an example, the number of second plurality of unit times may be configured to a value mapped to the aggregation level. That is, the UE may use the value mapped to the aggregation level of the PDCCH carrying the received DCI as the number of repetitions of the PUCCH. As an another example, based on the aggregation level being configured to the first value or less, the number of second plurality of unit times is configured to the second value mapped to the aggregation level. Based on the aggregation level being configured to exceed the first value, the second plurality of unit times may be configured to a third value mapped to the aggregation level. That is, the number of corresponding second plurality of unit times may be determined depending on whether the aggregation level is configured to a value below or above a specific reference value (e.g., the first value).

As another example, based on the aggregation level being configured to 8, the number of the second plurality of unit times is configured to the fourth value mapped to the aggregation level. Based on the aggregation level being configured to 16, the number of second plurality of unit times may be configured to the fifth value mapped to the aggregation level. At this time, the fourth value and the fifth value may be the same. Since the UE may not be able to distinguish between aggregation levels 8 and 16, the values mapped to each of aggregation levels 8 and 16 may be the same.

As another example, the DCI may include a specific field indicating whether the aggregation level is configured to 8 or 16. That is, the UE may distinguish whether the aggregation level is configured to 8 or 16 through the corresponding specific field.

And, based on the aggregation level being configured to 1, 2, or 4, the number of the second plurality of unit times mapped to the aggregation level may be indicated by a specific field. That is, the field for distinguishing whether the aggregation level is configured to 8 or 16 may be used to indicate the number of second plurality of unit times when the aggregation level is configured to 1, 2, or 4.

As another example, a value mapped to the aggregation level may be determined based on at least one of the format of the DCI, the payload size of the DCI, or the code rate of the DCI. That is, individual values may be mapped to the aggregation level according to at least one of the format of the DCI, the payload size of the DCI, or the coding rate of the DCI. Accordingly, the number of second plurality of unit times may also vary depending on at least one of the format of the DCI, the payload size of the DCI, or the coding rate of the DCI.

As another example, the number of second plurality of unit times may be configured to a value mapped to the value indicated by the PRI field.

As another example, based on the aggregation level being configured to the sixth value or less, the number of second plurality of unit times may be configured to the seventh value mapped to the value indicated by the PRI field. And, based on the aggregation level being configured to exceed the sixth value, the number of second plurality of unit times may be configured to the 8th value mapped to the aggregation level.

As an example, PUCCH transmission after PUCCH transmission is performed in each of the second plurality of unit times may be performed based on configuration information. That is, after repeated PUCCH transmission is performed based on information related to DCI, the UE may perform PUCCH transmission based on the configuration information. For example, the UE may perform PUCCH transmission in each of the first plurality of unit times. However, this is only an example, and the UE may perform repeated PUCCH transmission in units of the second plurality of unit times.

Figure 8:
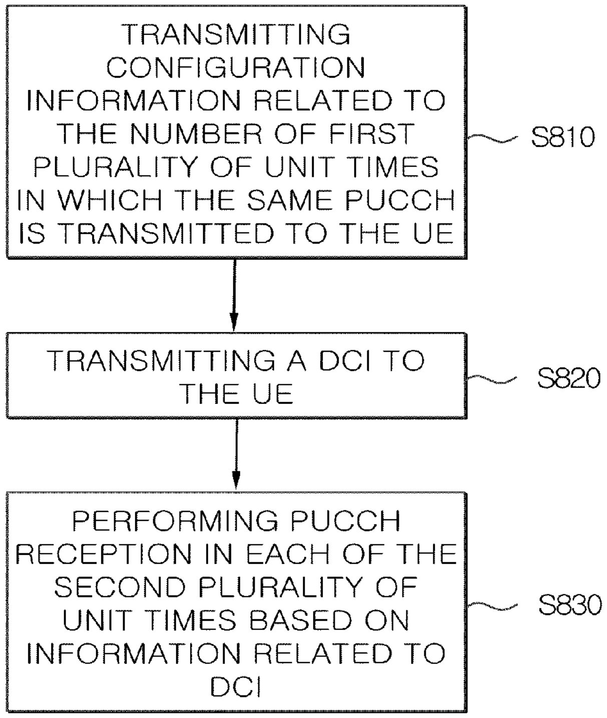
FIG. 8 is a diagram for describing an uplink reception operation or a downlink transmission operation of a base station in a wireless communication system to which the present disclosure may be applied.

FIG. 8 is a diagram for describing a PUCCH reception method of a base station in a wireless communication system to which the present disclosure may be applied.

The base station may transmit configuration information related to the number of first plurality of unit times in which the same PUCCH is (or will be) transmitted to the UE (S810).

The base station may transmit DCI to the UE (S820). And, the base station may perform PUCCH reception in each of the second plurality of unit times based on information related to DCI (S830).

Since the operations and features according to S810, S820, and S830 correspond to the operations and features according to S710, S720, and S730, redundant description will be omitted.

Hereinafter, a method for dynamically indicating the number of repeated transmissions of PUCCH will be described in detail.

The PUCCH resource configuration method for the UE may be different before and after RRC connection. Accordingly, Embodiment 1 describes a method of dynamically indicating the number of repeated transmissions for PUCCH (e.g., initial PUCCH) before RRC connection. Embodiment 2 describes a method of dynamically indicating the number of repeated transmissions for PUCCH after RRC connection. Embodiment 3 describes the operation of the UE when the number of PUCCH repeated transmissions dynamically indicated and the number of PUCCH resources indicated by RRC signaling are different.

Embodiment 1

If dedicated PUCCH resource configuration information is not provided (i.e., PUCCH-related configuration information is not provided before RRC connection), previously, the number of PUCCH repetition transmissions may not be applied to the UE. At this time, if the UE is in a situation where uplink coverage is insufficient, PUCCH transmission and reception between the terminal and the base station may not be smooth, and latency may increase as the base station requests the UE to retransmit the PUCCH. In particular, when the path loss is large, such as FR2, the PUCCH transmission and reception situation may worsen.

More seriously, although the UE transmits the PUCCH at maximum power, the base station may not receive it. Since PUCCH repetitive transmission has not been configured/applied to the UE, the base station may not receive PUCCH from the UE until the uplink channel quality reaches a certain level. Therefore, in a situation where dedicated PUCCH resource configuration information is not received, repeated transmission of PUCCH may be necessary. Hereinafter, a method for dynamically configuring/indicating PUCCH repetitive transmission in the corresponding situation will be described.

Embodiment 1-1

Msg (message). 3 PUSCH or Msg. The number of repetitions applied to A PUSCH transmission may be applied to the initial PUCCH transmission.

The base station may indicate/configure the repetition number of Msg. 3 PUSCH to the terminal through a random access response (RAR) UL grant. Because adding a repetition factor of the first PUCCH to the RAR UL grant may cause signaling overhead, the UE may equally apply the repetition element corresponding to the Msg. 3 PUSCH indicated in the RAR UL grant to the PUCCH.

That is, the UE may apply the repetition number N applied to Msg. 3 PUSCH transmission or the repetition number M applied to Msg. A PUSCH transmission indicated in the most recent RAR UL grant to the first PUCCH transmission. An option to be described later may be applied in relation to the timing of indicating the number of repetitions of Msg. 3 PUSCH/Msg. A PUSCH.

As option 1-1, if, within a certain time (e.g., in X slot), the base station indicates the repetition number N of Msg. 3 PUSCH or the repetition number M of Msg. A PUSCH in the RAR UL grant, the UE may apply the corresponding repetition number N or M as the repetition number of the first PUCCH. The specific time may be a predefined (or agreed upon) time, but is not limited thereto and may be configured by the base station.

As option 1-2, if the repetition number N of Msg. 3 PUSCH is indicated by the RAR UL grant, or the repetition number M of Msg. A PUSCH is indicated, the UE may always perform repeated transmission N or M times for the first PUCCH.

As options 1-3, the UE may apply the repetition number N (or M) applied to the most recent Msg. 3 PUSCH transmission (or Msg. A PUSCH transmission) performed in the most recent RACH process as the repetition number of the first PUCCH transmission.

In addition, when the repetition number N of the (most recent) Msg. 3 PUSCH or the repetition number M of the Msg. A PUSCH is indicated, the UE may apply the option described later in relation to the application of the first PUCCH repetition number.

As option 2-1, the UE may transmit the first PUCCH repeatedly N or M times. In the case of options 1-3, the N value (or M value) may be applied as the number of repetitions of the first PUCCH transmission.

At this time, if N and M are different (e.g., in options 1-1 or 1-2), the UE may select a larger or smaller value among N and M, and use the selected value as the number of repetitions for the first PUCCH transmission. However, it is not limited to this, and the UE may use the number calculated by a predefined method as the number of repetitions of the first PUCCH transmission.

As option 2-2, the UE may use the indicated N or M multiplied by the scaling factor F as the number of repetitions of the first PUCCH transmission. For example, the number of repetitions applied to the first PUCCH transmission may be determined in the form of floor (Nx F) or ceil (Nx F).

At this time, the scale factor F may be configured to a system information block (SIB) or determined as the ratio of the number of symbols between PUSCH and PUCCH. For example, if the scale factor F is determined by the ratio of the number of symbols between PUSCH and PUCCH, when the number of symbols in a single PUSCH resource is K and the number of symbols in a single PUCCH resource is L, the scale factor F may be determined as K/L, floor (K/L), or ceil (K/L).

Through a combination of one of Option 1-1, Option 1-2, and Option 1-3, and one of Option 2-1 and Option 2-2, the number of repetitions of the initial PUCCH transmission may be determined.

Embodiment 1-2

The aggregation level of the DCI scheduling the PUCCH (i.e., the aggregation level of the PDCCH carrying the DCI) and the repetition number of the PUCCH may be mapped by a predefined method. The UE may use the repetition number mapped to the aggregation level as the repetition number of the first PUCCH transmission. For example, the aggregation level of DCI and the number of repetitions of the first PUCCH transmission may be mapped as shown in Table 10, but are not limited to this.

TABLE 10

| DCI aggregation level | Initial PUCCH repetition |
|---|---|
| 1 | 1 |
| 2 | 2 |
| 4 | 4 |
| 8 | 8 |
| 16 | 8 |

As another example, a set of applicable repetition number values, rather than the repetition number of PUCCH, may be determined by the aggregation level. For example, at a low aggregation level, a small set of repetition count values may be configured, and at a high aggregation level, a large set of repetition count values may be configured. Additionally, the UE may dynamically select the repetition number value by combining various methods. According to the above-described method, the granularity of the appropriate number of repetitions may be refined depending on the UE or network situation. Additionally, it may reduce the amount of information related to the repetition number size that would be provided by other methods (e.g., specifying the repetition number by PRI).

As another example, the size of the repetition number of the applied PUCCH (or a set of configurable repetition times) may be distinguished through the section (or duration) of the aggregation level. For example, when the aggregation level is less than 8 and when it is more than 8, individual PUCCH repetition count values may be configured. As another example, one of the sets of repetition numbers may be determined by the aggregation level, corresponding to sets of different repetition number values.

As another example, the mapping between the aggregation level and the repetition number of PUCCH may be configured by the base station (e.g., by RRC signaling). That is, the base station may configure the PUCCH format to which the method is applied or the repetition number values to which the method is applied for the UE. The base station may provide scheduling flexibility by controlling whether to apply the number of repetitions and the size of the number of repetitions according to the situation.

At this time, the reason for using a high PDCCH aggregation level may be the DCI coding rate rather than the CCE, so the method of mapping the repetition number (or repetition element) to the PDCCH aggregation level may need to be refined. That is, the method of mapping the number of repetitions of PUCCH to the aggregation level may vary depending on the DCI format or DCI payload size.

For example, for each DCI format or DCI payload size, the aggregation level and number of repetitions of the first PUCCH transmission may be mapped individually. Alternatively, the aggregation level and the number of repetitions of the first PUCCH transmission may be individually mapped according to the DCI coding rate. The mapping relationship between the aggregation level and the number of repetitions of the first PUCCH transmission may be defined in the form shown in Table 9.

By the methods described above, etc. based on the format, payload size, or coding rate of the DCI scheduling the PUCCH, the UE may be indicated to repeat the number of repetitions according to the aggregation level, and may use the repetition number as the repetition number of the first PUCCH transmission.

In applying the above-described method, aggregation levels 8 and 16 may be indistinguishable from the UE's perspective. Therefore, aggregation levels 8 and 16 may always be treated together. For example, the same number of repetitions of PUCCH transmission or a set of PUCCH repetition number values may be mapped/indicated at aggregation levels 8 and 16.

As another example, a separate field (e.g., 1 bit) to distinguish aggregation levels 8 and 16 may be added to the DCI content to indicate the number of repetitions of PUCCH or other UL signals. If the aggregation level is 8, the value of the field may be configured to 0), and if the aggregation level is 16, the value of the field may be configured to 1. Based on the field, the UE may distinguish between aggregation levels 8 and 16. At this time, a different set of repetition numbers of PUCCH transmission/number of repetitions of PUCCH transmission may be mapped/indicated to each of aggregation levels 8 and 16.

And, the field added to DCI to distinguish aggregation levels 8 and 16 may be used for other purposes for aggregation levels 1, 2, and 4. For example, for aggregation levels 1, 2, and 4, the corresponding field may indicate the number of repetitions of PUCCH transmission.

As another example, if it is impossible to distinguish between aggregation levels (e.g., when aggregation level 32 is introduced, etc.), the indication of the number of repetitions of PUCCH through the aggregation level that cannot be distinguished may be excluded.

Additionally, the field (or bit) for distinguishing aggregation levels 8 and 16 may use a specific bit of DCI or a field of a specific DCI rather than a new field. For example, aggregation levels 8 and 16 may be distinguished by the state generated by specific bits of the DCI or the combination of bits in the fields of a specific DCI.

When the above-described method is applied, HARQ-ACK for multiple TBs may be carried on one PUCCH. At this time, the aggregation levels of PDCCHs scheduling the plurality of TBs may not be the same. In order to determine the number of repetitions of PUCCH transmission, a standard (e.g., a standard for scheduling DCI) may be needed to select a specific aggregation level among a plurality of different aggregation levels. As an example of the above standard, the number of repetitions of PUCCH transmission may be derived based on the aggregation level of the first or last DCI among scheduling DCIs corresponding to HARQ-ACK for a plurality of TBs to be transmitted.

Embodiment 1-3

The base station may directly indicate the number of repetitions of the first PUCCH transmission. For example, the base station may specify the number of repetitions of the first PUCCH through SIB 1 or/and other system information. Alternatively, the base station may explicitly specify the number of repetitions of PUCCH through DCI (e.g., PRI field in DCI).

Therefore, the procedure for indicating the number of repetitions of PUCCH transmission for a UE for which a dedicated PUCCH resource is not configured may be performed using 1) a step where the UE receives PUCCH transmission indications from the base station, 2) a step where the UE acquires the number of repetitions of PUCCH according to Embodiment 1-1, Embodiment 1-2, or Embodiment 1-3, and 3) step where the UE transmits PUCCH as many repetitions as the PUCCH is obtained.

Embodiment 2

For a UE for which dedicated PUCCH resources are configured, the number of repetitions of PUCCH transmission may be indicated by RRC signaling (e.g., 'PUCCH-FormatConfig'). At this time, the corresponding repetition number may be applied to long section PUCCH (i.e., PUCCH formats 1, 3, and 4). Accordingly, if the number of repetitions cannot be dynamically indicated, it is not possible to adaptively cope with the channel environment. In Embodiment 2, a method for dynamically indicating the number of repetitions will be described.

Here, for a UE for which dedicated PUCCH resources are configured, the number of repetitions of PUCCH transmission may be configured/indicated through the method described in Embodiment 1.

As an another example, if the aggregation level of DCI is equal to or higher than a specific value, the corresponding repetition number may be configured/indicated for the UE through the method described in Embodiment 1. If the aggregation level of DCI is equal to or lower than a specific value, the method described in Embodiment 1 may not be applied. Accordingly, the degree of freedom in PUCCH resource selection may be maintained.

Embodiment 2-1

A mapping relationship between the PRI state and the repeating element may be established. That is, if the repetition number (or repetition element) R is configured in PRI state, PUCCH resources corresponding to the PRI state X may be repeatedly transmitted R times regardless of the CCE index. The mapping relationship between the value (ΔPRI) of the PRI field in the DCI format and the corresponding repetition number R may be a many-to-one relationship. For example, the mapping relationship between the value of the PRI field and the corresponding repetition number R may be implemented as shown in Equation 5, but it is not limited to this and a predefined relationship may be applied.

$$2^{\lfloor log_2(\Delta_{PRI}) \rfloor} = R \quad \text{[Equation 5]}$$

At this time, R may be a value within the range of the number of repetitions of PUCCH transmission configured by RRC. That is, R may be one of 1, 2, 4, or 8.

Embodiment 2-2

The repetition number of PUCCH transmission configured through 'PUCCH-FormatConfig' is maintained, but the repetition number may be added within the upper layer signaling (e.g., 'PUCCH-Resource') that sets the PUCCH resource. For example, as shown in Table 11 below, a parameter ('nrofSlots') indicating the number of repetitions may be included in 'PUCCH-Resource'.

TABLE 11

```
PUCCH-Resource ::=              SEQUENCE {
  pucch-ResourceId              PUCCH-ResourceId,
  startingPRB                     PRB-Id,
  intraSlotFrequency Hopping         ENUMERATED { enabled }
OPTIONAL, -- Need R
  secondHopPRB                                          PRB-Id
OPTIONAL, -- Need R
  nrofSlots                            ENUMERATED {n2,n4,n8}
OPTIONAL, -- Need S
  format                             CHOICE {
    format0                            PUCCH-format0,
    format1                            PUCCH-format1,
    format2                            PUCCH-format2,
    format3                            PUCCH-format3,
    format4                            PUCCH-format4
  }
}
```

'nrofSlots' in the 'PUCCH-Resource' may indicate the number of repetitions of the PUCCH, and may indicate a format-specific repetition number of the PUCCH. It is possible to adaptively cope with instantaneous channel changes through format-specific repetition number (or repetition element) indication of the PUCCH. That is, in order to overcome the case where the base station's reception SNR is low, when 'nrofSlots' is indicated through 'PUCCH-Resource' as above, the UE may determine that 'inteslotFrequency Hopping' is enabled (even if it is not indicated in 'PUCCH-FormatConfig'). Alternatively, when 'nrofSlots' is indicated through 'PUCCH-Resource', the UE may determine that 'additionalDMRS' is 'true' (even if it is not indicated through 'PUCCH-FormatConfig'). Existing 'interslotfrequencyhopping' and 'additionalDMRS' may be indicated through 'PUCCH-FormatConfig', as shown in Table 7. The relationship between 'nrofslot' included in 'PUCCH resource' and the number of repetitions for each PUCCH format may be predefined or set by the base station. For example, if the number of repetitions for each PUCCH format is configured to K, the number of repetitions R configured in 'PUCCH resource' may not be expected to be less than K. In other words, the UE may expect to be set so that K≤R.

As another example, when the number of repetitions for each PUCCH format is configured to K, the number of repetitions R configured in 'PUCCH resource' may not be expected to be greater than K. In other words, the UE may expect to be configured so that R≤K.

Alternatively, the UE may expect that the number of repetitions for each PUCCH format and the number of repetitions in the 'PUCCH resource' are not configured overlappingly. For example, if K is configured to a specific PUCCH format, R may not be configured to the PUCCH resource set to the specific format. As another example, if R is configured in a certain PUCCH resource, K may not be configured in the PUCCH format of the corresponding PUCCH resource. Accordingly, ambiguity related to the UE's PUCCH transmission operation may be reduced.

Accordingly, the procedure for indicating the number of repetitions of PUCCH transmission for a UE for which dedicated PUCCH resources are configured may be performed with 1) a step where the UE receives PUCCH transmission indications from the base station, 2) a step in which the UE acquires the number of repetitions of the dynamically indicated PUCCH according to Embodiment 2-1 or Embodiment 2-2, and 3) step where the UE transmits PUCCH as many repetitions as the PUCCH is obtained.

Embodiment 3

When the repetition number R of PUCCH is dynamically indicated according to Embodiment 2-1 or/and Embodiment 2-2, a conflict may occur between the value indicated by R and 'nrofslot' of the existing 'PUCCH-FormatConfig'. Although both information indicate the number of repetitions of PUCCH transmission, the repetition number R indicated according to Embodiment 2-1 or/and Embodiment 2-2 may be indicated dynamically, and 'nrofslot' of 'PUCCH-FormatConfig' may be indicated by RRC signaling. That is, the update cycles between the two are configured differently, and thus there may be conflicts.

To interpret the relationship between the dynamically indicated repetition number R of the PUCCH and the repetition number of the PUCCH (i.e., 'nrofSlot') configured through 'PUCCH-FormatConfig', options to be described later for the UE may be applied.

As Option 3-1, the UE may apply the dynamically indicated number of PUCCH repetitions R only once. That is, the dynamically indicated number of PUCCH repetitions may be applied only to the corresponding PUCCH.

As option 3-2, the UE may override 'nrofSlots' of 'PUCCH-FormatConfig' and apply the dynamically indicated PUCCH repetition number R. That is, the UE may update the 'nrofSlots' value of 'PUCCH-FormatConfig' not only through RRC signaling but also through a dynamic repetition number indication method.

As option 3-3, if the repetition number R for each PUCCH format is dynamically indicated, the UE may ignore 'nrofSlots' of 'PUCCH-FormatConfig'. For example, if the base station dynamically indicates the repetition number R for PUCCH format 3, the UE may ignore the repetition number indicated by 'nrofSlot' and transmit the scheduled PUCCH format 3 repeatedly R times until the repetition number is indicated by a separate RRC or dynamic indication method.

As Option 3-4, the UE may determine that the dynamically indicated number of PUCCH repetitions R is valid only in a specific time interval (e.g., M slot) from the point in time indicated. That is, from the time when the number of repetitions is dynamically indicated, the number of repetitions of the PUCCH within M slots is not separately specified, and the UE may perform repeated transmission of the PUCCH as many times as the dynamically indicated repetition number (i.e., R times). Based on the dynamically indicated point in time, the PUCCH indicated after M slots may be repeatedly transmitted as many times as configured by 'nrofSlot' in 'PUCCH-FormatConfig'. And, if the value configured by 'nrofSlot' in 'PUCCH-FormatConfig' does not exist, the UE may not transmit PUCCH repeatedly.

If the number of repetitions for each PUCCH format is configured to K, the dynamically indicated number of PUCCH repetitions R may not be expected to be smaller than K. In other words, the UE may expect to be configured so that K≤R. As another example, when the number of repetitions for each PUCCH format is configured to K, the dynamically indicated number of PUCCH repetitions R may not be expected to be greater than K. In other words, the UE may expect to be set so that R≤K.

Alternatively, the UE may not expect the two parameters to be configured overlappingly. For example, when K is configured to a specific PUCCH format, the dynamically indicated PUCCH repetition number R may not be configured for the PUCCH configured to the specific format. As another example, when the dynamically indicated PUCCH repetition number R is configured, the repetition number K may not be configured in the corresponding PUCCH format.

Therefore, the UE's determination method for the number of repetitions of the dynamically indicated PUCCH and the number of repetitions of the PUCCH configured through 'nrofSlots' in 'PUCCH-FormatConfig' and the RRC IE update procedure may be comprised of the following steps (1) and 2).

1) A step in which the UE is dynamically indicated to the number of PUCCH repetitions N according to Embodiment 2-1, Embodiment 2-2, etc.
2) When the number of repetitions M is indicated as 'nrofSlots' in 'PUCCH-FormatConfig' of the indicated PUCCH format, a step in which the UE determines whether to repeat PUCCH transmission N or M times according to Embodiment 3-1, Embodiment 3-2, Embodiment 3-3, Embodiment 3-4, etc., and determines whether to update the PUCCH repetition number of RRC.

Figure 9:
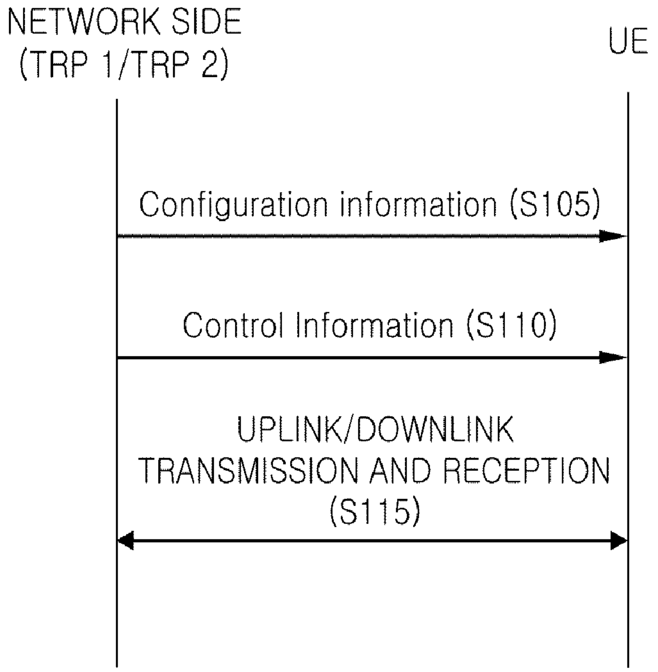
FIG. 9 is a diagram for describing the signaling procedure of the network side and the terminal according to an embodiment of the present disclosure.

FIG. 9 is a diagram for describing the signaling procedure of the network side and the UE according to an embodiment of the present disclosure.

FIG. 9 shows an example of signaling between a network side and a terminal (UE) in a situation where the Embodiments (e.g. Embodiment 1, Embodiment 1-1, Embodiment 1-2, Embodiment 1-3, Embodiment 2, Embodiment 2-1, Embodiment 2-2, Embodiment 3, or a combination of one or more of its specific Embodiments) of the present disclosure described above may be applied.

Here, the UE/network side is exemplary and may be applied to various devices as described with reference to FIG. 10. FIG. 9 is for convenience of description and does not limit the scope of the present disclosure. In addition, some step(s) shown in FIG. 9 may be omitted depending on circumstances and/or configurations. In addition, in the operation of the network side/UE of FIG. 9, the above-described random access procedure operation or the like may be referred to or used.

In the following description, the network side may be one base station including a plurality of TRPs, or may be one cell including a plurality of TRPs. Alternatively, the network side may include a plurality of remote radio heads (RRHs)/remote radio units (RRUs). For example, an ideal/non-ideal backhaul may be established between TRP 1 and TRP 2 constituting the network side. In addition, although the following description is based on a plurality of TRPs, this may be equally extended and applied to transmission through a plurality of panels/cells, and may also be extended and applied to transmission through a plurality of RRHs/RRUs.

In addition, although described based on "TRP" in the following description, as described above, "TRP" may be replaced with expressions of a panel, an antenna array, a cell (e.g., a macro cell/small cell/pico cell, etc.), a TP (transmission point), a base station (e.g., gNB, etc.), and the like. As described above, the TRP may be classified according to information (e.g., CORESET index, ID) on the CORESET group (or CORESET pool).

As an example, when one UE is configured to perform transmission/reception with a plurality of TRPs (or cells), this may mean that a plurality of CORESET groups (or CORESET pools) are configured for one UE. The configuration of such a CORESET group (or CORESET pool) may be performed through higher layer signaling (e.g., RRC signaling, etc.).

In addition, the base station may mean a generic term for an object that transmits and receives data with the UE. For example, the base station may be a concept including one or more TPs (Transmission Points), one or more TRPs (Transmission and Reception Points), and the like. In addition, the TP and/or TRP may include a panel of a base station, a transmission and reception unit, and the like.

The UE may receive configuration information from the network side (S105).

For example, the configuration information may include information related to network side configuration (i.e., TRP configuration), resource allocation information related to uplink/downlink transmission and reception (e.g., configuration information of PUCCH resources), etc. The configuration information may be transmitted through a higher layer (e.g., RRC, MAC CE). The configuration information may include information related to uplink transmission based on a configured grant (CG). The configuration information may include the number of repeated transmissions of the PUCCH (i.e., the number of unit times (e.g., slots) in which the PUCCH will be transmitted, etc.).

Additionally, if the configuration information is defined or configured in advance, the corresponding step may be omitted.

For example, the operation in which the UE (100 or 200 of FIG. 10) receives the configuration information from the base station (200 or 100 of FIG. 10) in step S105 described above can be implemented by the device of FIG. 10 to be described below. For example, referring to FIG. 10, one or more processors 102 may control one or more transceivers 106 and/or one or more memories 104 to receive the configuration information, and one or more transceivers 106 may receive the configuration information from a network side.

The UE may receive control information from the base station (S110). For example, the UE may receive a DCI scheduling uplink/downlink from the network side. The DCI may include a PRI field to indicate PUCCH resources. Additionally, if the control information is defined or configured in advance, the corresponding step may be omitted.

For example, the above-described operation of transmitting the DCI from the UE (100 or 200 in FIG. 10) to the base station (200 or 100 in FIG. 10) in step S110 can be implemented by the device of FIG. 10 to be described below. For example, referring to FIG. 10, one or more processors 102 may control one or more transceivers 106 and/or one or more memories 104 to transmit the control information, and one or more transceivers 106 may transmit the control information to a base station.

The UE and the network may perform uplink/downlink transmission and reception operations (S115). For example, the UE may transmit PUCCH to the network. At this time, the UE may perform PUCCH transmission in each of a plurality of unit times (e.g., slots, etc.) based on information related to DCI.

Here, the information related to the DCI may include at least one of the PRI field included in the DCI or the aggregation level corresponding to the PDCCH carrying the DCI. The UE may use the PRI field or the value corresponding to the aggregation level as the number of PUCCH repeated transmissions.

As another example, the terminal may determine the number of repetitive PUCCH transmissions based on the Embodiments of this disclosure (e.g., a combination of one or more of Embodiment 1, Embodiment 1-1, Embodiment 1-2, Embodiment 1-3, Embodiment 2, Embodiment 2-1, Embodiment 2-2, Embodiment 3, or detailed Embodiments thereof) and transmit the PUCCH equal to the determined number of repetitive transmissions.

For example, the operation of the UE (100 or 200 in FIG. 10) in step S115 described above transmitting uplink to the network side (200 or 100 in FIG. 10) or receiving downlink from the network side (200 or 100 in FIG. 10) may be implemented by the device of FIG. 10, which will be described below.

Figure 10:
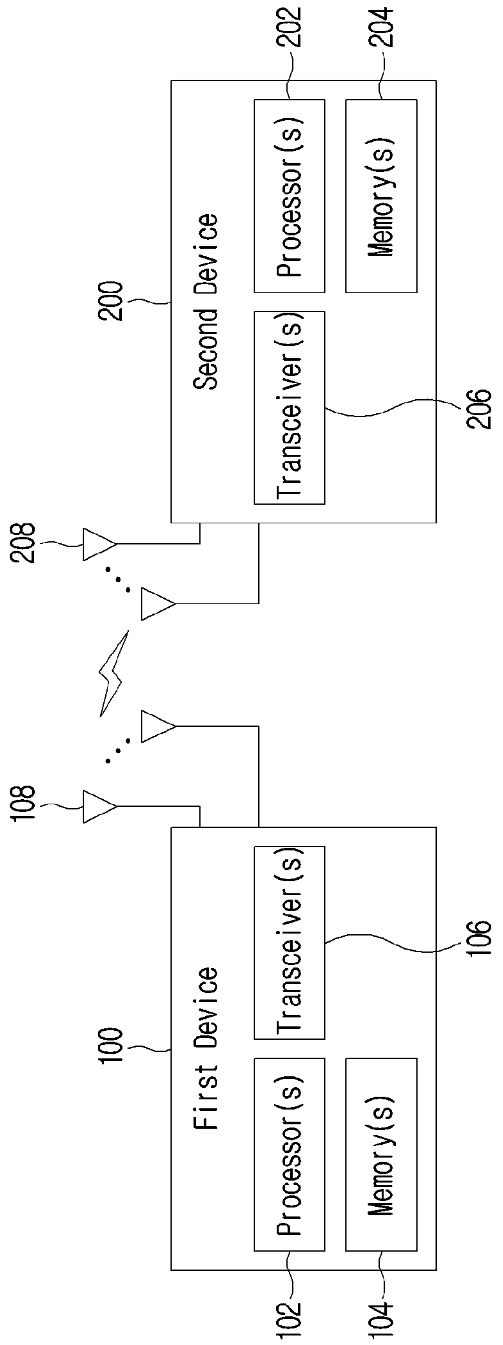
FIG. 10 illustrates a block diagram of a wireless communication device according to an embodiment of the present disclosure.

For example, referring to FIG. 10, one or more processors 102 may control one or more transceivers 106 and/or one or more memories 104, etc. to transmit uplink or receive downlink, and one or more transceivers 106 may transmit uplink or receive downlink to the network side.

General Device to which the Present Disclosure May be Applied

FIG. 10 illustrates a block diagram of a wireless communication apparatus according to an embodiment of the present disclosure.

Referring to FIG. 10, the first device 100 and the second device 200 may transmit/receive radio signals through various radio access technologies (e.g., LTE, NR).

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure.

For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104.

A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat S1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method performed by a user equipment (UE) comprising:

receiving, from a base station, a physical uplink control channel, PUCCH, configuration including information related to at least one PUCCH resource and a number of first plurality of slots with a same PUCCH;

receiving, from the base station, downlink control information (DCI) including a PUCCH resource indicator (PRI) field; and based on a PUCCH resource among the at least one PUCCH resource being indicated by the PRI field and including a number of a second plurality of slots for repetition of PUCCH transmission, performing first PUCCH transmission in each of the second plurality of slots based on information related to the DCI, wherein before receiving the PUCCH configuration from the base station, a number of a third plurality of slots for repetition of an initial PUCCH transmission is based on a number of repetitions for physical uplink shared channel (PUSCH) transmission scheduled by random access response (RAR) uplink (UL) grant.

2. The method of claim 1, wherein:
the number of second plurality of slots is configured to a value mapped to the aggregation level.

3. The method of claim 2, wherein:
based on the aggregation level being configured to a first value or less, the number of the second plurality of slots is configured to a second value mapped to the aggregation level, and
based on the aggregation level being configured to exceed the first value, the number of the second plurality of slots is configured to a third value mapped to the aggregation level.

4. The method of claim 2, wherein:
based on the aggregation level being configured to 8, the number of second plurality of slots is configured to a fourth value mapped to the aggregation level,
based on the aggregation level being configured to 16, the number of the second plurality of slots is configured to a fifth value mapped to the aggregation level, and
the fourth value and the fifth value are same.

5. The method of claim 1, wherein:
the DCI includes a specific field indicating whether the aggregation level is configured to 8 or 16.

6. The method of claim 5, wherein:
based on the aggregation level being configured to 1, 2, or 4, the number of the second plurality of slots mapped to the aggregation level is indicated by the specific field.

7. The method of claim 1, wherein:
a value mapped to the aggregation level is determined based on at least one of a format of the DCI, a payload size of the DCI, or a code rate of the DCI.

8. The method of claim 1, wherein:
the number of second plurality of slots is configured to a value mapped to a value indicated by the PRI field.

9. The method of claim 1, wherein:
based on the aggregation level being configured to a sixth value or less, the number of second plurality of slots is configured to a seventh value mapped to a value indicated by the PRI field, and
based on the aggregation level being configured to exceed the sixth value, the number of the second plurality of slots is configured to a eighth value mapped to the aggregation level.

10. The method of claim 1, wherein:
second PUCCH transmission after the first PUCCH transmission is performed in each of the second plurality of slots.

11. The method of claim 1, wherein:
the number of the second plurality of slots is a value less than or equal to the number of the first plurality of slots.

12. A user equipment (UE) comprising:
at least one transceiver; and
at least one processor coupled to the at least one transceiver,
wherein the at least one processor is configured to:
receive, from a base station through the at least one transceiver, a physical uplink control channel (PUCCH) configuration including information related to at least one PUCCH resource and a number of first plurality of slots with a same PUCCH;
receive, from the base station through the at least one transceiver, downlink control information (DCI) a PUCCH resource indicator (PRI) field; and
based on a PUCCH resource among the at least one PUCCH resource being indicated by the PRI field and including a number of a second plurality of slots for repetition of PUCCH transmission, perform First PUCCH transmission in each of a second plurality of slots,
wherein before receiving the PUCCH configuration from the base station, a number of a third plurality of slots for repetition of an initial PUCCH transmission is based on a number of repetitions for physical uplink shared channel (PUSCH) transmission scheduled by random access response (RAR) uplink (UL) grant.

13. A base station comprising:
at least one transceiver; and
at least one processor coupled to the at least one transceiver,
wherein the at least one processor is configured to:
transmit, to a user equipment (UE) through the at least one transceiver, a physical uplink control channel (PUCCH) configuration including information related to at least one PUCCH resource and a number of first plurality of slots with a same PUCCH;
transmit, to the UE through the at least one transceiver, downlink control information (DCI) a PUCCH resource indicator (PRI) field; and
based on a PUCCH resource among the at least one PUCCH resource being indicated by the PRI field and including a number of a second plurality of slots for repetition of PUCCH reception, perform first PUCCH reception in each of a second plurality of slots,
wherein before transmitting the PUCCH configuration to the UE, a number of a third plurality of slots for repetition of an initial PUCCH reception is based on a number of repetitions for physical uplink shared channel (PUSCH) reception scheduled by random access response (RAR) uplink (UL) grant.

* * * * *